United States Patent
Schultz (10) Patent No.: US 7,475,594 B2
(45) Date of Patent: Jan. 13, 2009

(54) VEHICLE WEATHER FORECASTER AND NAVIGATION DEVICE WITH INTEGRATED POWER GENERATOR

(76) Inventor: Neil Schultz, 212 Manida St., Bronx, NY (US) 10474

( * ) Notice: Subject to any disclaimer, the term of this patent is extended or adjusted under 35 U.S.C. 154(b) by 0 days.

(21) Appl. No.: 11/835,407

(22) Filed: Aug. 7, 2007

(65) Prior Publication Data

US 2008/0312837 A1 Dec. 18, 2008

Related U.S. Application Data

(60) Provisional application No. 60/944,478, filed on Jun. 15, 2007.

(51) Int. Cl.
*G01W 1/00* (2006.01)
(52) U.S. Cl. .................................................. 73/170.16
(58) Field of Classification Search ................ 73/170.16
See application file for complete search history.

(56) References Cited

U.S. PATENT DOCUMENTS

| | | | | |
|---|---|---|---|---|
| 6,427,535 | B1 * | 8/2002 | Sakai et al. | 73/587 |
| 6,920,789 | B2 * | 7/2005 | Sakai | 73/587 |
| 7,114,388 | B1 * | 10/2006 | French et al. | 73/170.16 |
| 7,249,502 | B2 * | 7/2007 | Luukkala et al. | 73/170.17 |
| 2003/0052777 | A1 * | 3/2003 | Bleier | 340/540 |
| 2004/0244476 | A1 * | 12/2004 | Andrews et al. | 73/170.01 |

* cited by examiner

*Primary Examiner*—Andre J Allen
(74) *Attorney, Agent, or Firm*—Loza & Loza, LLP; Julio M. Loza (57) ABSTRACT

A weather forecasting and navigation device for vehicles is provided that generates local or specific weather forecast information while generating its own power. In one example, the device may include an integrated wind turbine that is turned by the wind flow created by the vehicle's motion to generate power for the device. In alternative implementations, instead of a wind turbine to generate power, different methods of power generation may be used. The device may also include a built-in alarm system that senses when the vehicle is moved and triggers an audible alarm.

20 Claims, 7 Drawing Sheets

Airflow Out

Figure 5

Airflow Out

VEHICLE WEATHER FORECASTER AND NAVIGATION DEVICE WITH INTEGRATED POWER GENERATOR

CLAIM OF PRIORITY UNDER 35 U.S.C. §119

The present Application for Patent claims priority to U.S. Provisional Application No. 60/944,478 entitled "Vehicle Weather Forecaster and Navigation Device with Integrated Power Generator", filed Jun. 15, 2007, and is hereby expressly incorporated by reference herein.

FIELD

The invention relates to navigation devices and particularly, to a navigation device adapted to provide both navigation direction and weather information while generating its own power or operating from an external power supply.

BACKGROUND

In many instances, having advance notice of weather information while on a road trip would be helpful. For example, the weather conditions during a trip may change quickly, thereby exposing a vehicle operator (e.g., motorcycle rider) to dangerous weather conditions (e.g., rain, thunder, hail, snow, etc.) while driving the vehicle (e.g., riding a bicycle, motorcycle, etc.). This is specially the case for vehicles in which the operator is exposed to the elements, such as bicycles, motorcycles, gliders, boats, etc. While many navigation devices, such as global positioning systems, have been disclosed in the prior art, these fail to provide specific weather information that may assist a vehicle operator in deciding which paths to take. In fact, many such prior art devices rely on receiving weather information from an external source to provide weather information. In many locations, such as mountains and deserts for example, such external source may be out of reach (e.g., signal and/or wireless service are not available).

Additionally, many prior art navigation devices are configured for manual use by an operator. However, vehicle operators such as motorcycle riders cannot use their hands to operate a navigation device while riding.

Moreover, in order to integrate an after-market navigation device into a vehicle, it is often necessary to provide either an external power source or batteries. Coupling the navigation device to the vehicle power source is undesirable since it requires a wire to be run to the vehicle's electrical circuit, thereby making installation cumbersome. In other instance, such as when using bicycles and gliders, a vehicle may not have a power source of its own. Additionally, using solely batteries as the power source for the navigation device makes the navigation device useless when the batteries die and replacement batteries are not readily available.

Consequently, a navigation device is needed that is easy to install and operate while providing a vehicle operator with pertinent weather forecast and direction information.

SUMMARY

A mobile weather forecasting device for mounting to a vehicle is provided. The device may include at least one sensor that measures one or more local weather characteristics. The at least one sensor may include a barometric sensor and a humidity sensor. A processing circuit may be coupled to the at least one sensor and configured to generate a weather forecast based on the one or more local weather characteristics. For example, a change in barometric pressure and/or humidity may be associated with a weather condition of the weather forecast. An output interface may be coupled to the processing circuit to provide the weather characteristics and the weather forecast. An input interface may allow configuring the processing circuit. An electronic compass may detect a direction in which the vehicle is heading and provides such direction to the processing circuit to output the direction through the output interface. A rechargeable power storage device may power the at least one sensor, processing circuit, and output interface.

A device enclosure may include a first chamber and a second chamber. The first chamber may be configured to house the at least one sensor, processing circuit, and output interface. The second chamber may be configured to house an integrated power generation device housed. In one example, the integrated power generation device may be a wind turbine that includes a fan and a generator. The fan may be positioned to turn due to air flow from the motion of the vehicle. The generator is coupled to the fan and configured to generate power when the fan turns; the generator providing such power to the rechargeable power storage device. The second chamber may also include an air input port and an air output port, the air input port directed toward the front of the vehicle. The second chamber may also include a drain hole that allows fluid to drain from the second chamber. In alternative exemplary implementations, the integrated power generation device may be at least one of a solar cell, a fuel cell, a temperature differential to voltage converter, a piezoelectric device, and a gravity self-winding device.

Another example provides a weather forecasting device for mounting to a vehicle, comprising: (a) at least one sensor that measures one or more local weather characteristics; (b) a processing circuit coupled to the at least one sensor, the processing circuit configured to generate a weather forecast based on the one or more local weather characteristics; (c) an output interface coupled to the processing circuit, the output interface providing the weather characteristics and the weather forecast; (d) a rechargeable power storage device that powers the at least one sensor, processing circuit, and output interface; and/or (e) an integrated power generation device including (1) a fan that is positioned to turn due to air flow from the motion of the vehicle; and (2) a generator coupled to the fan and configured to generate power when the fan turns, the generator providing such power to the rechargeable power storage device. An electronic compass may also be included that detects a direction in which the vehicle is heading and provides such direction to the processing circuit, wherein the processing circuit outputs the direction through the output interface. An alarm device may also be included that, when activated, senses motion of the vehicle and triggers an audible alarm.

Additionally, a device enclosure may include a first chamber and a second chamber, wherein the first chamber is configured to house the at least one sensor, processing circuit, and output interface, and the second chamber is configured to house the integrated power generation device. The second chamber may include an air input port and an air output port, the air input port directed toward the front of the vehicle.

Consequently, a weather forecasting device is provided for mounting to a vehicle, comprising: (a) means for obtaining one or more local weather characteristics; (b)means for generating a weather forecast based on the one or more local weather characteristics; (c) means for providing the local weather characteristics and the weather forecast to a vehicle operator; (d) means for converting air flow from the motion of the vehicle to electrical power; (e) means for obtaining navigation information for the vehicle; and/or (f) means for sensing motion of the vehicle and triggering an audible alarm.

DETAILED DESCRIPTION OF THE INVENTION

In the following detailed description of the invention, numerous specific details are set forth in order to provide a thorough understanding of the invention. However, the invention may be practiced without these specific details. In other instances well known methods, procedures, and/or components have not been described in detail so as not to unnecessarily obscure aspects of the invention.

One aspect of the invention provides a novel device that provides weather forecast and navigation information to a vehicle operator while generating its own power. In one example, the device may include an integrated wind turbine that is turned by the wind flow created by the vehicle's motion to directly generate power for the device or charge a battery. In alternative implementations, instead of a wind turbine to generate power, different methods of power generation may be used. For instance, a remote wind turbine (separate from the or other power generation or storage source separate from the device may be used.

Figure 1:
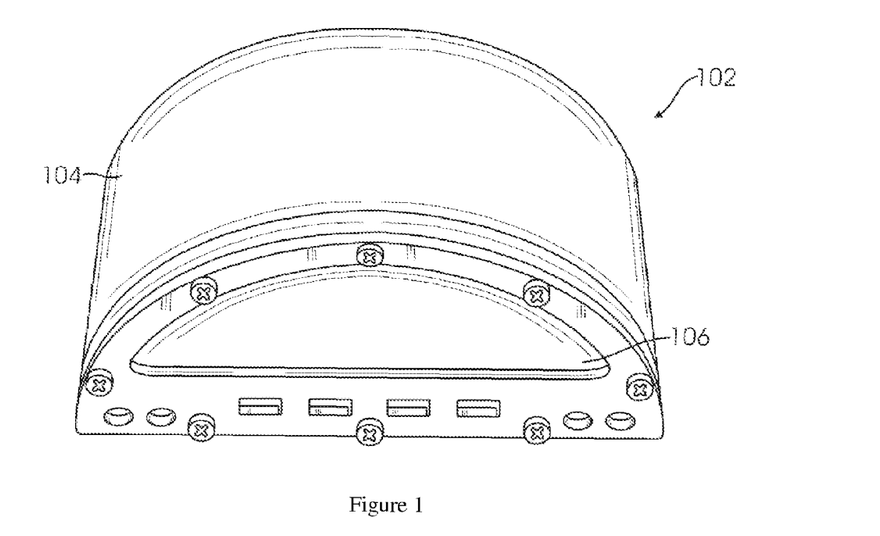
FIG. 1 illustrates a front and top perspective view of a navigation and weather forecast device that may be mounted on a vehicle to provide a vehicle operator with location-specific and real-time weather forecasts and information along with navigation information.

FIG. 1 illustrates a front and top perspective view of a navigation and weather forecast device 102 that may be mounted on a vehicle, such as a motorcycle, bicycle, snowmobile, airplane, boat, or off-road vehicle, to provide a vehicle operator with location-specific and real-time weather forecasts and information along with navigation information. The device 102 may include a housing 102 and a user interface 106. The housing 104 may serve to store circuits and/or sensors that are configured to perform weather forecasting and/or provide navigation information, along with a power source and a power generation source. The user interface 106 may include a display device and a plurality of buttons that an operator can use to configure, set, and/or operate the device 102. In this example, the housing 104 may have a semicircular profile to provide an aesthetically pleasing look.

Figure 2:
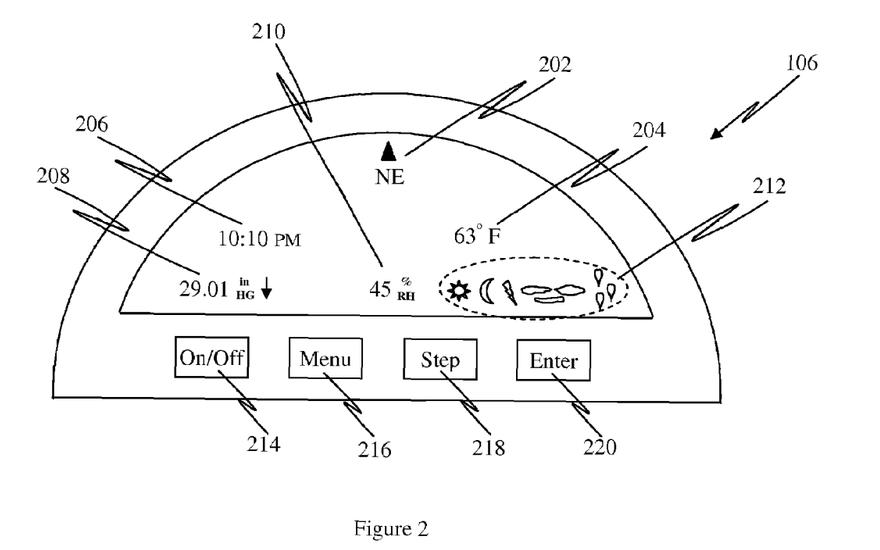
FIG. 2 illustrates an example of the user interface for the navigation and weather forecast device.

FIG. 2 illustrates an example of the user interface 106 for the navigation and weather forecast device 102. The navigation and weather forecast device 102 may be configured to provide navigation information such as a direction 202 (e.g., based on a compass) as well as a current time 206. Additionally, weather information, such as a temperature 204, barometric pressure 208 and/or relative humidity 210 may be generated and provided to the operator. In addition to collecting weather information, the device 102 may also use that weather information to provide weather forecast 212 to the operator, such as sunny, darkness, thunderstorm, cloudy, and/or rain. The navigation, weather, and forecast information is specific to the current location of the device 102. Such weather information and weather forecasts may warn an operator of potentially dangerous or undesirable weather conditions.

The user interface 106 may also include a plurality of buttons that the operator may use to configure and/or operate the device 102. For example, an On/Off button 214 may be used to power the device 102 on and off, a Menu button 216 allows an operator to request different functions (e.g., configure time, compass direction, calibrate one or more sensors, etc.), a Step button 218 allows scrolling between one or more menu options, and the Enter button 220 allows selection of a desired menu option. In various implementations, fewer or greater number of buttons may be provided to allow the operator to interface with the device 102.

Figure 3:
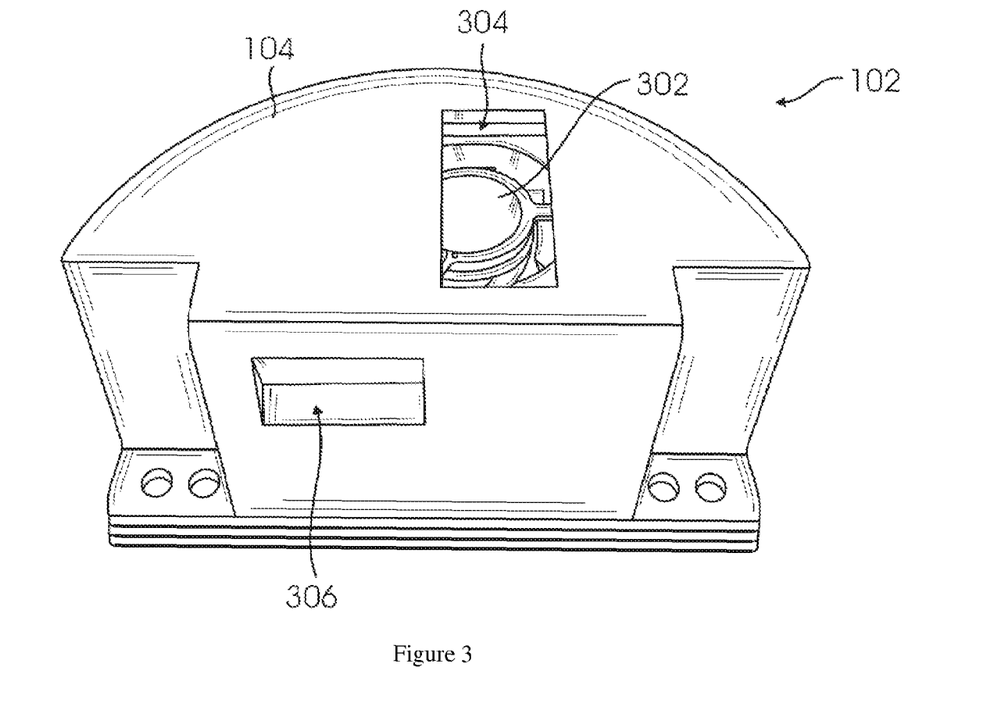
FIG. 3 illustrates a bottom and rear perspective view of the navigation and weather forecast device.

FIG. 3 illustrates a bottom and rear perspective view of the navigation and weather forecast device 102. In this example, the device 102 includes an integrated wind turbine to generate power. The wind turbine includes a fan 302 that is turned by air flowing through a first input port 304 (on a rear surface) and flowing out of an output port 306 (on the bottom surface. The interior cavity in which the wind turbine is housed may be configured to facilitate the flow of air from the input port 304 to the output port 306. When the device 102 is in use, the input port 304 may be positioned facing the front of the vehicle so that as the vehicle moves, air flows into the input port 304 and causes the fan 302 to rotate.

Figure 4:
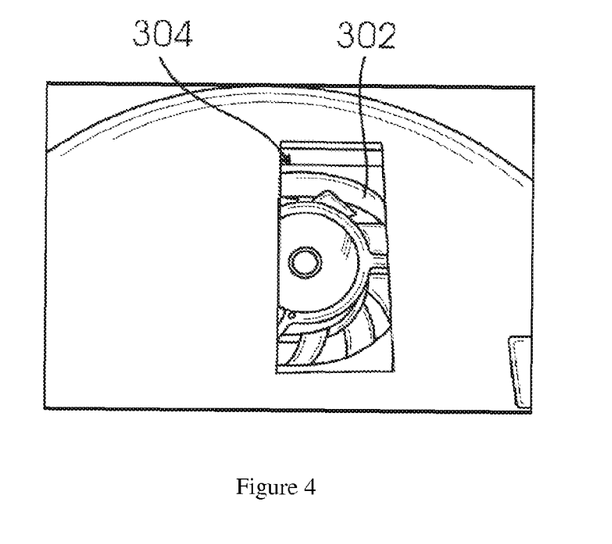
FIG. 4 illustrates a close-up view of the air input port and fan for the wind turbine housed within the navigation and weather forecast device.

FIG. 4 illustrates a close-up view of the air input port 304 and fan 302 for the wind turbine housed within the navigation and weather forecast device 102. Note that the blades of the fan 302 may be oriented or position to be turned when air flows in the input port 304.

Figure 5:
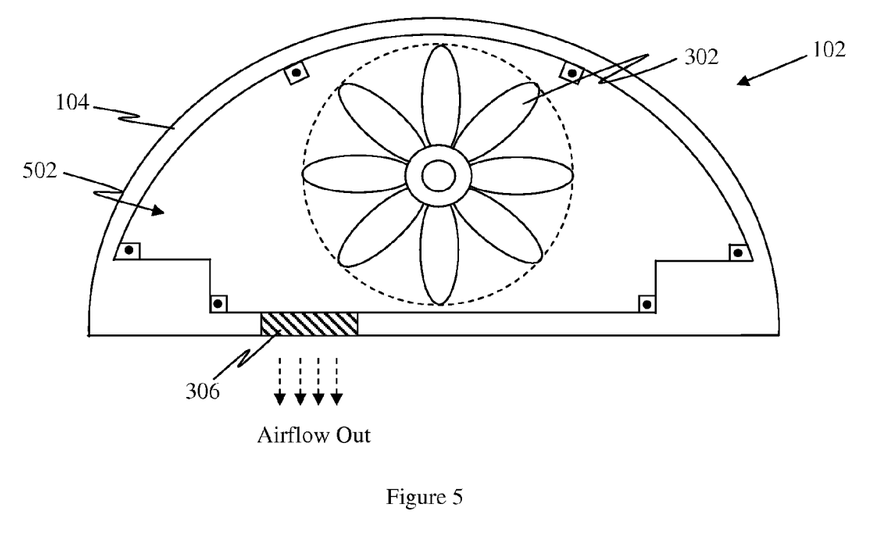
FIG. 5 illustrates a cross-sectional view of the navigation and weather forecast device.

FIG. 5 illustrates a cross-sectional view of the navigation and weather forecast device 102. In this view, the internal chamber 502 of the housing 104 can be seen to include the fan 302. The output port 306, through which air leaves the chamber 502 is also illustrated. The blades for the fan 302 of the wind turbine may be oriented to cause the turbine to turn when air enters the chamber 502 through the input port 304.

Figure 6:
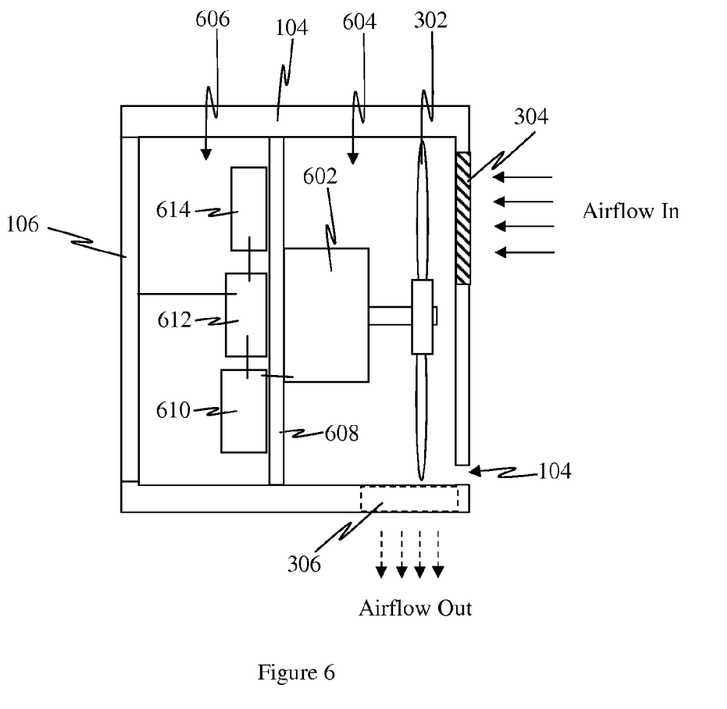
FIG. 6 illustrates a second cross-sectional view of the navigation and weather forecast device.

FIG. 6 illustrates a second cross-sectional view of the navigation and weather forecast device 102. This view illustrates the housing 104 having the input port 304 on the rear end and the user interface 106 at the front end. A first chamber 604 and a second chamber 606 are formed within the housing 104 by a barrier 608 within the housing 104. The wind turbine includes the fan 302 coupled to a generator 602 that generates power when the fan 302 turns. The wind turbine is housed on the rear portion of the housing 104. An outlet hole 608 may be provided to allow any water to drain from the first chamber 604. For instance, rain water or other moisture may enter the first chamber 604 and the outlet hole 608 provides a way for such water to exit the first chamber 604. The second chamber 606 may serve to house a rechargeable internal power source 610 (e.g., batteries, capacitor, etc.) that is electrically coupled to the generator 602 and configured to be recharged by the generator 602. The power source 610 serves to power one or more circuits 612 and/or sensors 614 that function to provide navigation, weather, and/or weather forecast information to the operator via the user interface 106.

In some implementations, a light sensor may also be coupled to the circuits 612. Depending on the ambient light, the light sensor may be used by the circuits 612 to automatically adjust the contrast level of the user interface 106 (e.g., light crystal display).

Figure 7:
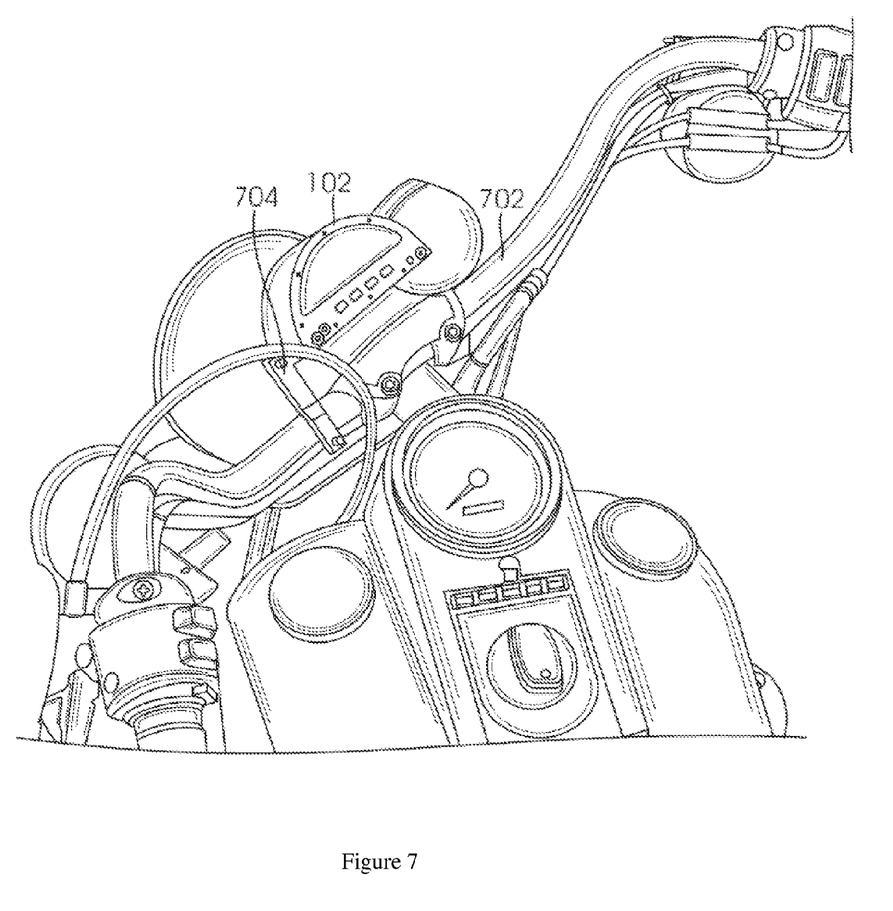
FIG. 7 illustrates how the navigation and weather forecast device may be mounted on a vehicle.

FIG. 7 illustrates how the navigation and weather forecast device 102 may be mounted on a vehicle. For example the device 102 may be mounted on the handle bars 702 of a motorcycle or bicycle using a bracket 704. The device 102 is positioned so that the vehicle operator can easily view the information without having to hold the device 102.

Figure 8:
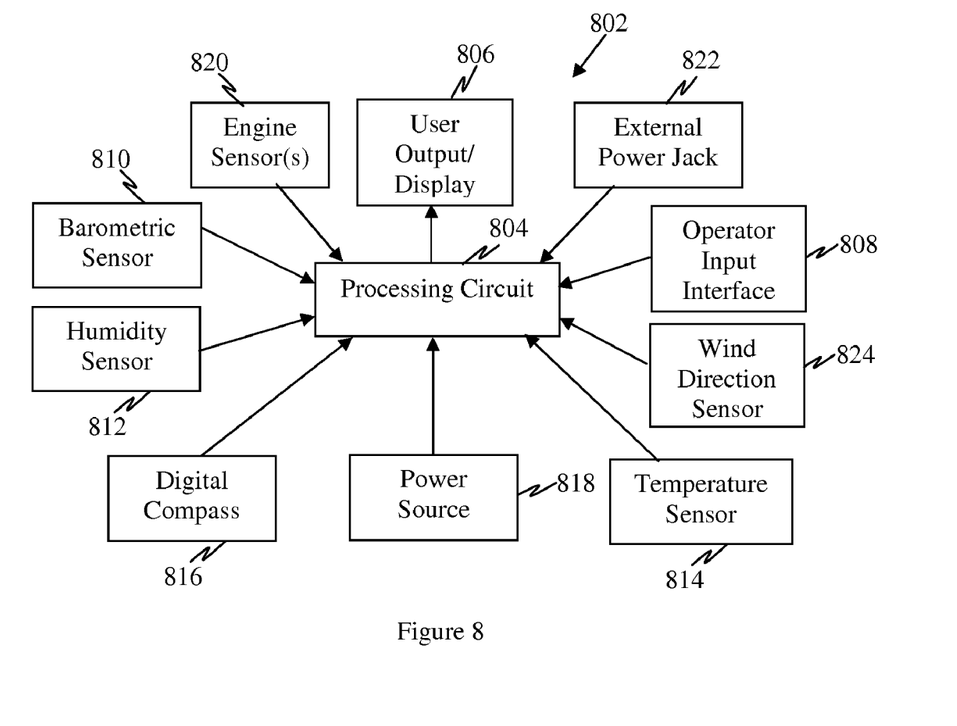
FIG. 8 is block diagram illustrating components of a navigation and weather forecast device according to one example.

FIG. 8 is block diagram illustrating components of a navigation and weather forecast device according to one example. The navigation and weather forecast device 802 may include a processing circuit 804 coupled to a user output/display 806, an operator input interface 808 (e.g., buttons, etc.), a barometric sensor 810, a humidity sensor 812, a temperature sensor 814, a digital compass 816, one or more engine sensors 820 (e.g., engine temperature sensor, oil pressure, oil temperature), among other sensors. The processing circuit 804, interfaces 806 and 808, and the sensors 810, 812, 814, and 816 may be powered by an internal power source 818 (e.g., rechargeable battery and wind turbine generator) and/or via an external power jack 822.

In one example, the user output 806 may include a Bluetooth-compliant interface that can send information (e.g. weather measurements, weather forecasts, sensor information, time, temperature, etc.) from the navigation and weather forecast device to the vehicle operator's Bluetooth-compliant earpiece or receiver. This allows an operator to receive information in audio form without having to look at the device display. The processing circuit may be configured to convert information into audio form that can be transmitted to the operator's Bluetooth-compliant earpiece or receiver.

In some implementations, the navigation and weather forecast device may also include a wind direction sensor 824 that indicates the direction that wind is blowing. The wind sensor may be configured to operate when the vehicle is stationary or moving slowly.

Figure 9:
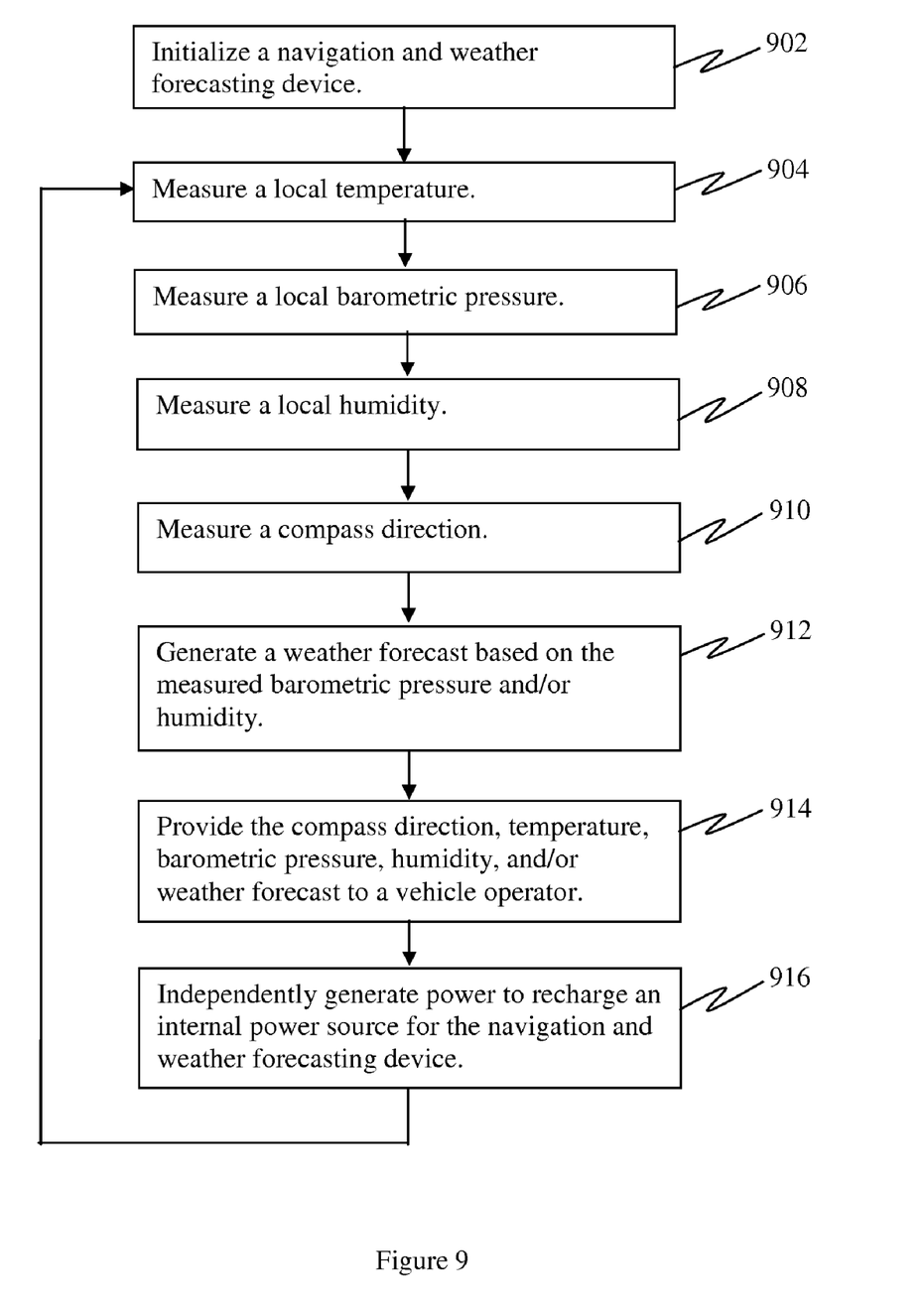
FIG. 9 illustrates a method operational in a navigation and weather forecasting device according to one example.

FIG. 9 illustrates a method operational in a navigation and weather forecasting device according to one example. The navigation and weather forecasting may be initialized 902, by setting a clock and/or calibrating one or more sensors or a compass. A local temperature is measured 904. Similarly, a local barometric pressure and humidity are measured 906 and 908. A compass direction may also be measured or ascertained 910. A weather forecast is generated based on the measured barometric pressure and/or humidity 912. The compass direction, temperature, barometric pressure, humidity, and/or weather forecast are provided to a vehicle operator 914. Power is independently generated to recharge an internal power source for the navigation and weather forecasting device 916.

In alternative implementations, instead of using a wind turbine to generate power, other integrated sources of power generation may be used. For example, solar cells may be mounted on the navigation and weather forecasting device may serve to power and/or recharge the device. A mechanism based on the "Seebeck effect" or the "Peltier effect", which convert temperature differentials into a voltage, may be used as a regenerative power source. Alternatively, a gravity or motion-based self-winding mechanism, a piezoelectric device, a fuel cell, a biomechanical mechanism, and/or a micro-engine may serve as the regenerative power source.

Moreover, the external power jack 822 may be provided to recharge the internal power source with an external power source. For example, the external power jack 822 may be coupled to an external solar panel, wind turbine generator, vehicle power supply, etc.

In yet other implementations, input ports may be provided on the device 102 to receive engine temperature, oil temperature, and/or oil pressure. Additionally, the device 102 may also provide an integrated alarm system for the vehicle. The device 102 may include a motion sensor that triggers an integrated alarm when it senses that the vehicle is being moved.

Figure 10:
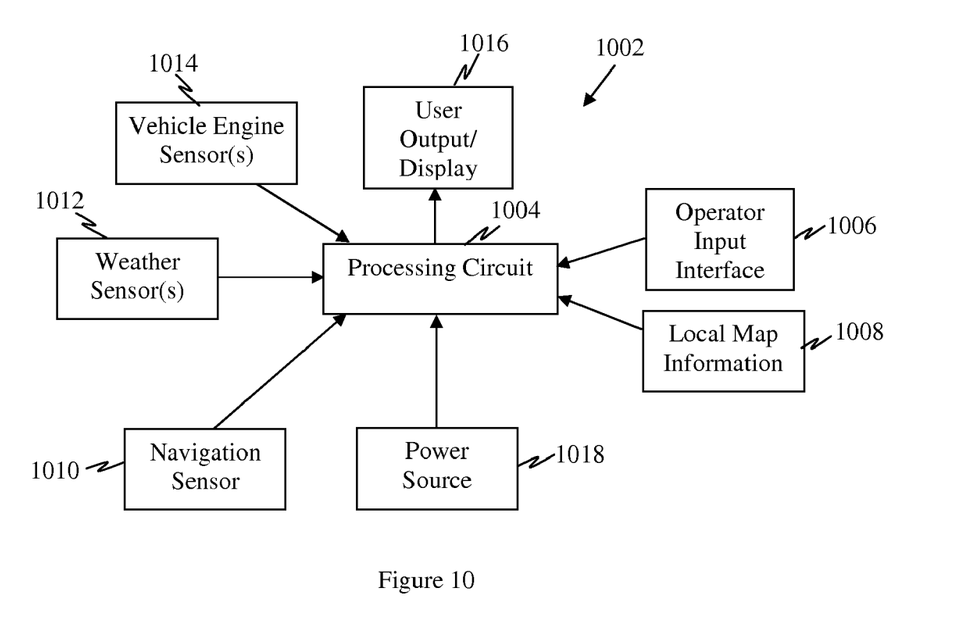
FIG. 10 illustrates a navigation and weather forecast device configured to provide localized navigation information.

FIG. 10 illustrates a navigation and weather forecast device configured to provide localized navigation information. The device 1002 may include a processing circuit 1004 coupled to a navigation sensor 1010 (e.g., directional compass, local positioning system, etc.), one or more weather sensors 1012 (e.g., humidity sensor, barometric sensor, temperature sensor, wind direction and speed sensor, etc.), and one or more vehicle engine sensors 1014 (e.g., engine temperature, oil temperature, oil pressure, etc.). The processing circuit 1004 receives information from the sensors 1010, 1012, and 1014 and provides it to the user via a user output or display 1016. The processing circuit may also be configured to generate a local weather forecast based on information obtained by the one or more weather sensors 1012.

The navigation and weather forecast device 1002 may also be configured to provide localized navigation information for a defined geographical region. For instance, the navigation and weather forecast device 1002 may be configured to operate within a golf course, a park, a resort, or other well-defined area. Typical global positioning-based navigation systems tend to provide street and highway information but often fail to provide detailed geographical details about parks, golf courses, resorts, and other well-defined areas. The navigation and weather forecast device 1002 provides an input interface 1006 (e.g., a universal serial port—USB, a memory card port, a communication port, etc.) that can be utilized to load detailed local map information 1008 for a well-defined region (e.g., golf course, park, resort, etc.) in which the device 1002 is used. For example, this allows a golf course owner to provide a detailed map information about a golf course, trails, hole locations, refreshment stands, etc., by mounting the device 1002 on golf carts used by golf players. The device 1002 may display the detailed map information to the user via the user output/display 1016 so they can navigate the golf course. The device 1002 may include a localized or global positioning receiver that allows it find its position within the well-defined region. For example, the device 1002 may use triangulation to determine its position within the well-defined region and display the corresponding area in the display 1016.

Additionally, the device 1002 may also be configured to receive position information for other devices (e.g., mounted on other golf carts) and display it on the user display 1016. This information may allow, for example, some users to determine whether a particular golf hole is available.

Additionally, wind direction and speed may be obtained by the device 1002 via a sensor 1012. This information may be provided to a golfer to assist him/her in hitting a shot.

As with previous embodiments described above, the device 1002 may include a regenerative power source 1018 (e.g., wind turbine, solar panel, etc.) that can be used to operate the device 1002.

One or more of the components, steps, and/or functions illustrated in FIGS. 1-9 may be rearranged and/or combined into a single component, step, or function or embodied in several components, steps, or functions without departing from the invention. Additional elements, components, steps, and/or functions may also be added without departing from the invention.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the invention or some of its features in hardware, programmable devices, firmware, software or a combination thereof. The invention or parts of the invention may also be embodied in a processor readable storage medium or machine-readable medium such as a magnetic, optical, or semiconductor storage medium.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A mobile weather forecasting device for mounting to a vehicle, comprising:
   at least one sensor that measures one or more local weather characteristics;
   a processing circuit coupled to the at least one sensor, the processing circuit configured to generate a weather forecast based on the one or more local weather characteristics; and
   an output interface coupled to the processing circuit, the output interface providing the weather characteristics and the weather forecast; and
   an integrated regenerative power generation device for powering the at least one sensor, processing circuit, and output interface.

2. The device of claim 1 further comprising:
   an electronic compass that detects a direction in which the vehicle is heading and provides such direction to the processing circuit, wherein the processing circuit outputs the direction through the output interface.

3. The device of claim 1 further comprising:
   a device enclosure including a first chamber and a second chamber, wherein the first chamber is configured to house the at least one sensor, processing circuit, and output interface.

4. The device of claim 1, wherein the integrated regenerative power generation device converts the motion of the vehicle into electrical power, and further comprising:
   a rechargeable power storage device that stores electrical power from the regenerative power device to power the at least one sensor, processing circuit, and output interface.

5. The device of claim 4 wherein the integrated regenerative power generation device is a wind turbine that includes
   a fan that is positioned to turn due to air flow from the motion of the vehicle; and
   a generator coupled to the fan and configured to generate power when the fan turns, the generator providing such power to the rechargeable power storage device.

6. The device of claim 5 wherein the fan and generator are housed in the second chamber, the second chamber including an air input port and an air output port, the air input port directed toward the front of the vehicle.

7. The device of claim 6 wherein the second chamber includes a drain hole that allows fluid to drain from the second chamber.

8. The device of claim 4 wherein the integrated regenerative power generation device is at least one of a solar cell, a fuel cell, a temperature differential to voltage converter, a piezoelectric device, and a gravity self-winding device.

9. The device of claim 1 wherein the at least one sensor includes a barometric sensor and a humidity sensor.

10. The device of claim 9 wherein a change in barometric pressure is associated with a weather condition of the weather forecast.

11. The device of claim 9 wherein a change in humidity is associated with a weather condition of the weather forecast.

12. The device of claim 1 further comprising:
    an input interface that allows configuring the processing circuit.

13. The device of claim 1 wherein the vehicle is a motorcycle.

14. A weather forecasting device for mounting to a vehicle, comprising:
    at least one sensor that measures one or more local weather characteristics;
    a processing circuit coupled to the at least one sensor, the processing circuit configured to generate a weather forecast based on the one or more local weather characteristics;
    an output interface coupled to the processing circuit, the output interface providing the weather characteristics and the weather forecast;
    a rechargeable power storage device that powers the at least one sensor, processing circuit, and output interface; and
    an integrated power generation device including
       a fan that is positioned to turn due to air flow from the motion of the vehicle; and
       a generator coupled to the fan and configured to generate power when the fan turns, the generator providing such power to the rechargeable power storage device.

15. The device of claim 14 further comprising:
    a device enclosure including a first chamber and a second chamber, wherein the first chamber is configured to house the at least one sensor, processing circuit, and output interface, and the second chamber is configured to house the integrated power generation device.

16. The device of claim 15 wherein the second chamber includes an air input port and an air output port, the air input port directed toward the front of the vehicle.

17. The device of claim 14 further comprising:
    an electronic compass that detects a direction in which the vehicle is heading and provides such direction to the processing circuit, wherein the processing circuit outputs the direction through the output interface.

18. The device of claim 14 further comprising:
an alarm device that when activated, senses motion of the vehicle and triggers an audible alarm.

19. A weather forecasting device for mounting to a vehicle, comprising:
means for obtaining one or more local weather characteristics;
means for generating a weather forecast based on the one or more local weather characteristics;
means for providing the local weather characteristics and the weather forecast to a vehicle operator; and
means for convening air flow from the motion of the vehicle to electrical power.

20. The device of claim 19 further comprising:
means for obtaining navigation information for the vehicle.

* * * * *